May 23, 1961 R. G. LE TOURNEAU 2,985,429
MOBILE LOGGING SPAR APPARATUS
Filed Aug. 28, 1956 3 Sheets-Sheet 1

INVENTOR.
Robert G. LeTourneau
BY Wm. T. Wofford
Attorney

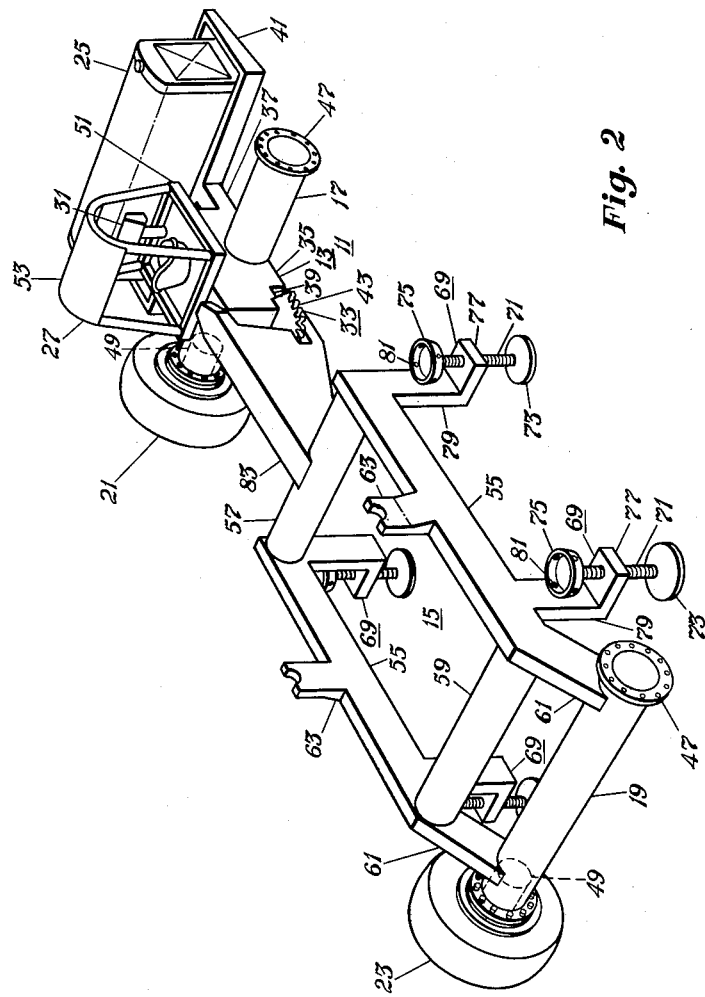

INVENTOR.
Robert G. LeTourneau
BY Wm. T. Wofford
Attorney

United States Patent Office 2,985,429
Patented May 23, 1961

2,985,429
MOBILE LOGGING SPAR APPARATUS
Robert G. LeTourneau, P.O. Box 2307, Longview, Tex.
Filed Aug. 28, 1956, Ser. No. 606,631
3 Claims. (Cl. 254—139.1)

My invention relates to logging apparatus, and more particularly to mobile spar machines for skidding logs to assembly areas where terrain conditions are not favorable for ground skidding.

The most usual way to get logs from the stumps to assembly points is by ground skidding with a crawler, or a logging arch. However, much good timber grows in areas where it is inaccessible to ground skidding apparatus, due to rough terrain. Common conditions are where the timber is in a ravine or small steep sided valley, or where the timber lies on the far side of a non-fordable stream. One practice in the past has been to rig a tall tree as a spar. This practice requires a great expenditure of time and effort, and of course depends upon the availability of a suitable tree. Some mobile spars have been built, but none have proved entirely satisfactory, either because they were too cumbersome to move from place to place, or because their capabilities were limited, or because operating costs were too high, or for various other reasons. The logging industry has been seeking a mobile spar logging machine which would make it economically feasible to harvest much good timber which otherwise must be left in the woods. A satisfactory machine should have a high degree of mobility, require minimum time and effort for rigging, and be capable of fast and efficient skidding operation.

It is accordingly the general object of my invention to provide an improved mobile spar type logging machine.

More specifically, it is the object of my invention to provide an improved spar type logging machine which shall have a high degree of mobility, which shall require a minimum of time and effort for rigging operation, and which shall be capable of fast and efficient skidding operations.

Another object of my invention is to provide an improved mobile spar type logging machine which shall be conveniently capable of skidding in all directions from the spar.

Another object of my invention is to provide a novel arrangement for spar erection.

Another object of my invention is to provide a novel cable drum and cable drum drive arrangement.

It is another object of my invention to provide a novel arrangement for controlling relative speeds of main line and haul back cable drums.

It is another object of my invention to provide novel and advantageous spar vehicle frame structure.

These and other objects are effected by my invention as will be apparent from the following description taken in accordance with the accompanying drawing, forming a part of this application, in which:

Fig. 2 is a schematic perspective view of the mobile spar machine of my invention with the near wheels, tower, cable drums and cable drum drive, fuel tank, and rigging, removed to show the vehicle frame construction;

Figures 1, 5:
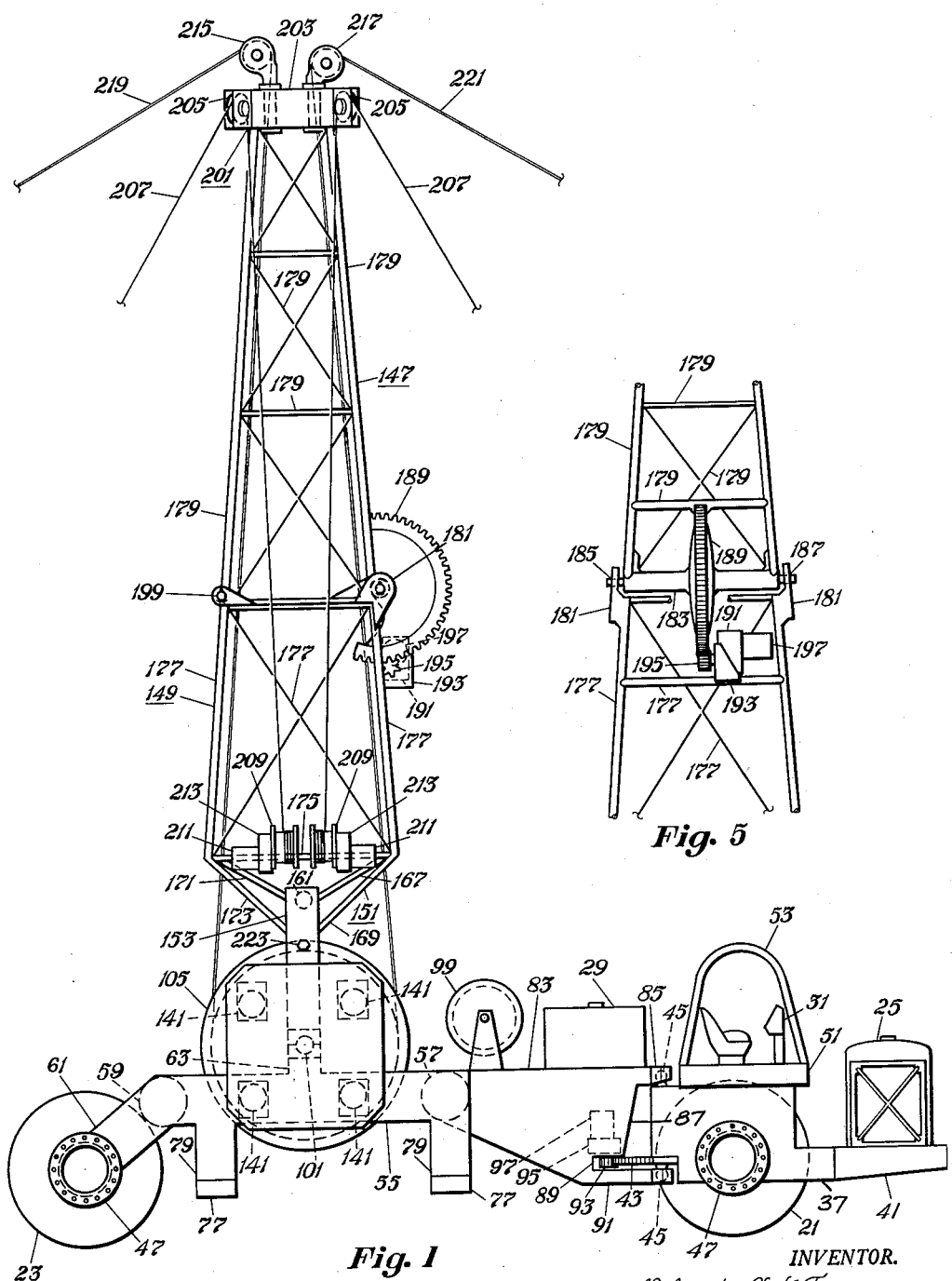
Fig. 1 is a schematic side elevational view showing the mobile spar machine of my invention with the near wheels, the frame support jacks, and some of the rigging, removed for clarity.
Fig. 5 is a schematic front elevational detail view showing pivoting of the upper tower section on the lower; and the arrangement of the upper tower section erection mechanism.

Referring now to the drawings, it will be seen that major components of the mobile spar machine are the vehicle assembly, the main line and haul back cable drum assembly, the tower, the tower erecting mechanism, and the tower rigging.

The vehicle assembly, designated generally by reference 11 includes: a front frame portion 13, a rear frame portion 15, front and rear axles 17, 19, front and rear wheels and wheel drive assemblies 21, 23, power plant 25, cab 27, fuel tank 29, operator's control station 31, and steering mechanism 33. The front frame portion 13 has a main beam 35 which is a welded box structure relatively narrow and deep extending longitudinally of the vehicle, and having an extension member 37 at its lower front portion and an undercut 39 at its lower rear portion. A power plant cradle 41 is fixed to the forward portion of the extension member 37 and extends transversely of the vehicle. A steering sector gear 43 is fixed to the upper face of the undercut 39 and extends rearwardly therefrom. Vertically aligned and transversely centered bearing balls 45, one upstanding and one depending, are fixed respectively to the top face rear of the main beam 35 and the lower face rear of the sector gear 43. The lower central portion of the main beam 35 is provided with a transverse opening which receives the tubular front axle 17, which is rigidly fixed thereto by welding. Alternatively, the front axle may be fixed to a rocking mount to allow rocking motion about a central longitudinally extending horizontal axis, in accordance with conventional practice. The axle carries bolt flanges 47 at its ends which are adapted to receive wheel and wheel drive assemblies 21. Each wheel of the vehicle is driven by an electric motor 49 through a gearing arrangement. The wheel and wheel drive assembly 21 is so arranged that it simply bolts onto the axle bolt flange 47 as a complete unit, with the motor 49 extending into the axle. For details of the general type of wheel and wheel drive assembly, reference is made to my U.S. patents, numbers 2,726,553 and 2,726,726. The power plant 25 is fixed to the power plant cradle 41 and comprises an internal combustion engine driving a generator (not shown), which in turn powers all the electric motors associated with the machine. In some cases it may be desirable to have the engine drive both A.C. and D.C. generators, so that D.C. may be used for traction motors and main cable drum drive motors, and A.C. for the various other motors associated with the machine. The cab 27, comprises a platform 51 which is fixed astride the top of the main beam 35, and a canopy 53 which is fixed to the platform. Within the cab is the operator's seat and the control station. The control station 31 includes a control panel carrying finger-tip actuated switches (not shown), which operate contactors (not shown) to control the machine functions. The machine may also be provided with a portable control box (not shown) so that the machine functions may be controlled from a remote location.

The vehicle rear frame portion 15 functions primarily as a chassis for mounting the tower, cable drums, and cable drum drive assembly. The rear frame portion comprises a pair of heavy box beam side members 55 disposed parallel to each other and extending longitudinally of the vehicle. The side members are spaced apart by front and rear heavy tubular members 57, 59 each extending transversely of the vehicle and rigidly fixed by welding to the inner faces of the side members 55 adjacent their front and rear extremities. The side members 55 and tubular members 57, 59 thus form a rectangular enclosure. The side members are each provided with a heavy box beam rear extension member 61 which is integral with the respective side member, and extends rearwardly and downwardly therefrom with the end shaped to conform to the outer surface of the tubular rear axle 19. The rear axle is transversely centered on the extension members and is rigidly fixed to them by welding. The rear axle is substantially identical to the front axle previously described, and carries bolt flanges 47 at its end. A wheel and wheel drive assembly 23 is bolted to the flange at each end of the axle. A pair of heavy upstanding aligned bearing mount pedestals 63 are disposed on the top side of said side members 55 at their longitudinal centers and are rigidly fixed thereto by welding. These bearing mounts are adapted to receive the lower half of bearing races which support the main shaft 101 of the cable drum and cable drum drive assembly which is indicated generally at 67 in Fig. 3. The rear frame carries four outriggers 69, one adjacent each corner of the rectangular enclosure aforementioned. Each outrigger comprises an upstanding threaded shaft 71 having a ground engaging plate 73 at its lower end and an actuating wheel 75 fixed to its upper end. The shaft 71 cooperates with threads in the outwardly extending plate portion 77 of the outrigger support, which plate is rigidly fixed to a depending member 79 which is in turn fixed to the respective rear frame side member 55. The outriggers act as stabilizers and levelling devices. The actuating wheels 75 have aligned holes 81 in them to permit use of a bar to exert required torque on the threaded shaft 71. The vehicle rear frame 15 includes a forward section in the form of a relatively deep and narrow box beam 83 which serves as a bridge member connecting the vehicle rear frame 15 to the vehicle front frame 13. The rear end of the bridge member 83 is shaped to conform to the contour of the outer surface of the front tubular member 57. The bridge member 83 is disposed longitudinally of the vehicle and is transversely centered on the front tubular member 57 and is rigidly fixed thereto by welding. The top face of the bridge member presents a planar, substantially horizontal surface, while the bottom face tapers downwardly and forwardly for about ⅔ of the bridge member's length and then is substantially horizontal. The front face of the bridge member presents several substantially plane surfaces; providing a forwardly extending projection 85 at the upper front portion carrying a bearing ball socket, a recessed middle portion 87, a rearwardly extending slot 89 near the bottom portion, and a forwardly extending projection 91 at the bottom portion carrying a bearing ball socket adjacent its end. The ball sockets just mentioned cooperate with the vertically aligned balls 45 on the rear of the vehicle front frame to provide for swinging motion of the vehicle front assembly about a vertical axis for steering. The sector gear 43 fixed to the vehicle front frame extends partially into the slot 89 above-mentioned and meshes with the output pinion 93 of a gear box 95 which is mounted inside the bridge member with its output shaft extending through the bridge member floor. The gear box 95 is driven by an electric motor 97 to provide power steering. Mounted astride the bridge member 83 adjacent its forward end is the fuel tank 29. Adjacent the rear end of the bridge member top face is mounted an electric motor driven straw line cable drum assembly 99.

Figure 3:
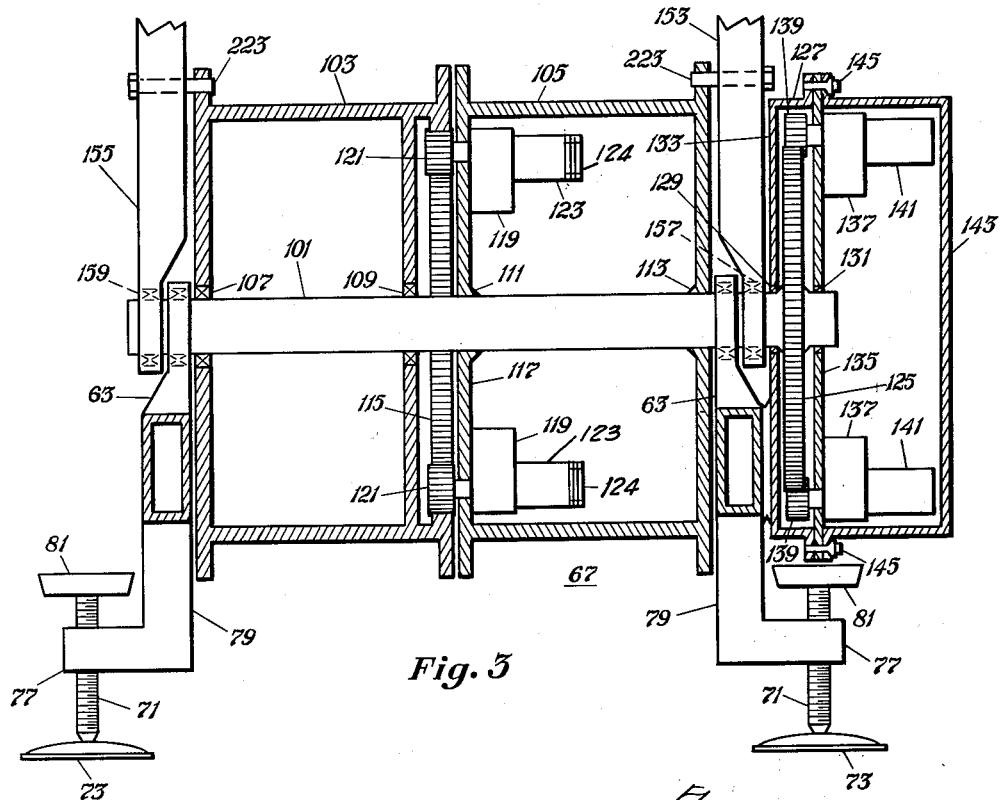
Fig. 3 is a schematic sectional view showing the cable drums and cable drum drive arrangement.

Referring now particularly to Fig. 3, there is shown a main shaft 101 which is journaled on bearings carried by the pedestal bearing mounts 63 hereinbefore mentioned. Carried by the main shaft between the shaft journals are two large cable drums 103, 105. The cable drum shown at the left in Fig. 3 will be hereafter called the haul back drum 103, and the one on the right the main line drum 105. The haul back drum 103 is journalled on the main shaft at 107 and 109, and carries a large ring gear 115 at its right end. The main line drum is fixed to the main shaft by welding at 111 and 113. Mounted inside the left wall 117 of the main line drum 105 and symmetrically disposed are a plurality of gear boxes 119 having output shafts extending through the wall and mounting pinions 121 which engage the large ring gear 115 aforementioned. The pinions 121 are driven through the gear boxes 119 by electrical motors 123 for a purpose to be hereinafter explained. Fixed to the right end of the main shaft 101 is a large bull gear 125. The bull gear is contained in a generally rectangular housing 127 having left and right walls 133, 135 journalled to the main shaft at 129 and 131, and having the left wall 133 fixed rigidly at its bottom portion to the vehicle rear frame right side member 55. The right wall 135 of the bull gear housing is removable, and carries a plurality of gear boxes 137 symmetrically disposed with their shafts extending through the wall and mounting pinions 139 which engage the bull gear 125. The pinions 139 are driven through the gear boxes 137 by electric motors 141, thus providing power for rotating the main shaft 101. The motors 141 and gear boxes 137 just mentioned are housed by a generally rectangular cover 143 open at the left end and bolted along the bull gear housing right wall to a flange on the remainder of the bull gear housing by means of bolts 145. Each of the cable drum drive motors 123, 141 is equipped with an electromagnetic brake 124 which is off when the motor is energized and on when the motor is de-energized. The electromagnetic brakes may be of the general type shown and described in my U.S. Patent Nos. 2,506,028 and 2,729,310.

Figure 4:
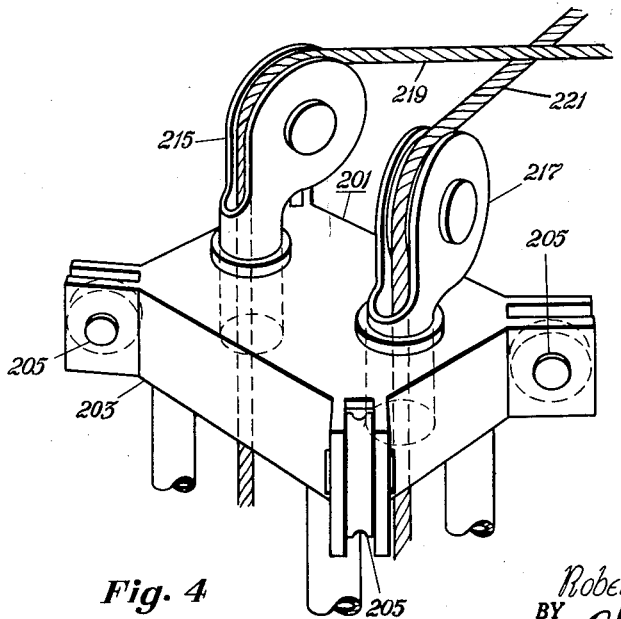
Fig. 4 is a detail perspective view showing the arrangement of the main line and haul back sheaves at the top of the tower.

The tower or spar per se comprises an upper section indicated generally at 147, and a lower section indicated generally at 149. The tower lower section is integral with a tower support section, indicated generally at 151, and which is journalled to the main shaft 101. The tower support section comprises a pair of heavy reinforced spaced parallel box beams 153, 155 each journalled at its lower end to the main shaft at 157 and 159 respectively. A heavy tubular member 161 is disposed horizontally between the inner faces of the box beams last mentioned adjacent their upper ends and rigidly fixed thereto by welding. Extending forwardly and upwardly from the front face of each tower support box beam 153, 155 are a first pair of heavy tubular members 167, 169. These members have their lower ends spaced apart, but their upper ends converge. Extending rearwardly and upwardly from the rear face of each tower support box beam are a second pair of tubular members 171, 173 substantially identical to and symmetrical with said first pair. The lower extremity of the tower lower section is made up of four heavy tubular members 175 joined at their ends to form a rectangular outline. The converging ends of each pair of members of the tower support section 151 are fixed one to each corner of the rectangle formed by the members 175 of the tower lower section lower extremity. The tower lower section is made up of a lattice truss work of tubular members 177 joined by welding, and tapers inwardly. The tower upper section 147 is also made up of a lattice trusswork of tubular members 179, and tapers inwardly. The tower upper section is designed to pivot on the lower section for power erection. A pair of trunnions 181 are fixed to the lower tower section upper extremity at adjacent tower corners and extend upwardly therefrom. A heavy shaft 183 is fixed to the lower extremity of one side of the tower upper section and is journalled on said trunnions 181 at 185 and 187. The heavy shaft just mentioned carries a large sector gear 189 at its center. Sector gear 189 is fixed adjacent its upper end to a tower cross-piece 179 for additional rigidity. A gear box 191 is mounted on a bracket 193 which is fixed to a cross member 177 of the tower lower section. The gear box has an output pinion 195 which engages the sector gear 189. The gear box 191 is driven by an electric motor 197. When the tower upper section is fully erected, it is locked in place by means of bolts 199 passing through cooperating eyes fixed alternately to the upper and lower tower sections. Capping the tower upper section is the sheave assembly indicated generally at 201 in Fig. 4. This assembly comprises a body portion 203 in the shape of a shallow rectangular box. Fixed to each corner of the box is a sheave 205. The sheaves are aligned to extend on the box diagonals. When the tower is erected, it is braced in upright position by cable guys 207. These guys are each carried by a separate cable drum 209 which is driven by an electric motor 211 through a gear box 213. A pair of guy cable drum and drive assemblies are mounted on each of two opposite sides of the tower base and extend outwardly therefrom. The guy cables 207 extend upwardly from the drums 209 on the outside of the tower to and over the guy sheaves 205 and then downward and outward to anchor points (not shown). A pair of sheave blocks 215, 217 are upstanding from the top of the sheave assembly body 203 and are swivelled for 360° rotation about vertical axes. One of these sheave blocks 215 is slightly higher than the other for a purpose to be hereinafter explained. One of these sheave blocks carries the main line cable 219, while the other carries the haul back cable 221. In each case the cable 219, 221 passes from a drum 103, 105 up inside the tower, through an opening in the tower cap body 203 which opening is coaxial with the sheave block 215, 217 swivel axis, and up over the sheave and then downward and outward therefrom. For erection, the tower support section 151 is keyed to the haul back and main line cable drums 103, 105 by heavy removable pins 223 which extend through the tower support box beams and the cable drum flanges. All electric motors associated with the spar machine are provided with brakes which are automatically engaged when the respective motor is de-energized. Regenerative braking is also used for the vehicle traction motors.

In the transport position, the lower tower section 149 folds rearward so that the tower support section rests on the rear tubular member 59 of the vehicle rear frame, while the upper tower section 147 folds forward and rests on the lower tower section. In the transport position, all cables are reeled onto their drums as far as feasible. When the vehicle has arrived on the work site, the outriggers 69 are lowered and levelled, and then the tower is erected. To accomplish erection, the tower upper section is first raised a few degrees. The mechanism 223 for keying the tower support section to the main line and haul back drum 105, 103 is engaged. Then, with the differential drive motors 123 stopped and braked, the main cable drum drive motors 141 are energized, causing the main shaft 101 to begin rotation. The main line and haul back cable drums then turn with the main shaft, raising the lower tower section. The remainder of the erection of the upper tower section is coordinated with the raising of the lower section to maintain the most favorable balance of the entire tower structure during the erection process. When the tower has been fully erected, the bolts 199 locking the upper section to the lower section are moved into lock position. The guy lines 207 are next unreeled and carried out with the aid of the straw line mechanism 99 to anchors (usually stumps or trees), and secured thereto. The guys are then tightened by their cable drum drive motors 211. While for simplicity only four guys are shown, six are usually used, and it is obvious that more can be used if that is deemed desirable. When the guys 207 are all tight, the mechanism keying the tower to the drums is unlocked.

In normal operation the haul back cable passes out from the tower top to a corner block then over to a tail block and then is fixed to the end of the main line cable. The tower top, the corner block and the tail block form the vertices of a triangle. The actual log haul is along the leg of the triangle between the tail block and the tower. Logs are attached to the main line cable adjacent its end portion by means of butt rigging and chokers. The cables on the haul back and main line drums are wound in opposite directions so that as the main line cable pays in the haul back cable pays out and vice versa. After the main line has towed a load of logs up to the tower, it is pulled back to the loading area by the haul back line. The degree of tension or slack on the main line and haul back cables can be readily controlled by action of the differential drive motors 123 which control the speed of rotation of the haul back drum 103 relative to that of the main line drum 105. The haul back cable is ordinarily well over twice as long as the main line cable, but can be much smaller in size. Since the main line and haul back cables are brought out of the tower top above all the guy cables 207, and the sheave blocks 215, 217 at the tower top can rotate about vertical axes, the machine is capable of skidding in all directions without requiring any change in rigging other than the moving of the tail block and corner block. Since one sheave block at the tower top is higher than the other, either the corner block or the tail block alone can be moved to change the skidding direction. The tail block and corner block can be moved alternately to change the skidding direction progressively clockwise or counterclockwise about the spar as a center, if required.

Although I have shown my invention in only one form it will be apparent to those skilled in the art that it is not so limited, but susceptible of various changes and modifications without departing from the spirit thereof.

I claim:

1. In a mobile spar structure of a type having a wheel-supported rectangular frame including a pair of parallel spaced side members, the combination comprising a bearing mount pedestal fixed to the upper face of each said side member at its longitudinal center portion, a main shaft journalled on said pedestals, an open-centered spar tower journalled at its lower extremity on said main shaft, a main-line cable drum fixed to said shaft between said pedestals, a haul-back cable drum journalled to said shaft between said pedestals, said drums carrying respective main line and haul-back cables which extend upwardly within said tower and over respective sheaves located at the top of said tower, a ring gear integral with said haul-back drum at its end portion adjacent said main line drum, a bull gear fixed to said shaft adjacent one end, a plurality of electric motors having output pinions drivingly engaging said bull gear, and a plurality of electric motors mounted within said main line drum and having output pinions drivingly engaging said ring gear.

2. A spar structure comprising a base frame, horizontally aligned spaced bearing mount pedestals carried by said frame, a main shaft journalled on said pedestals, means for driving said shaft, a cable drum fixed on said shaft and carrying cable, said cable drum being normally utilized to pay said cable in and out, a spar tower journalled on said shaft, and lock means for temporarily and removably fixing said tower to said drum and against relative movement with respect to said drum, whereby said tower may be erected by rotating said drum.

3. A spar structure comprising a base frame, horizontally aligned spaced bearing mount pedestals carried by said frame, a main shaft journalled on said pedestals, means for driving said shaft, main line and haul-back cable drums having outer flanges and juxtaposed on said shaft between said pedestals, said main line drum being fixed to said shaft and said haul-back drum being journalled on said shaft, a ring gear carried by said haul-back drum on the side adjacent said main line drum, a plurality of electric motors mounted within said main line drum and having output pinions drivingly engaging said ring gear, braking means on said motors for restraining said drums against relative rotational movement when said motors are de-energized, a spar tower journalled on said shaft, and lock means removably engaging the outer flanges of said drums and said spar tower, whereby said tower may be erected by driving said drums.

References Cited in the file of this patent

UNITED STATES PATENTS

| | | |
|---|---|---|
| 1,110,003 | Overly et al. | Sept. 8, 1914 |
| 1,162,392 | Overly et al. | Nov. 30, 1915 |
| 1,395,735 | Sawyer | Nov. 1, 1921 |
| 1,421,183 | Ditson | June 27, 1922 |
| 2,168,463 | Wunsch | Aug. 8, 1939 |
| 2,194,124 | Rhodes | Mar. 19, 1940 |
| 2,258,383 | Haniquet | Oct. 7, 1941 |
| 2,267,705 | Athy | Dec. 30, 1941 |
| 2,275,195 | Martin | Mar. 3, 1942 |
| 2,300,480 | Woolslayer et al. | Nov. 3, 1942 |
| 2,403,081 | Hilborn | July 2, 1946 |
| 2,495,563 | Woolslayer et al. | Jan. 24, 1950 |
| 2,558,254 | Johnson | June 26, 1951 |
| 2,582,548 | Larson | Jan. 15, 1952 |
| 2,694,474 | Meany | Nov. 16, 1954 |
| 2,880,827 | Gilmore | Apr. 7, 1959 |
| 2,883,068 | McIntyre | Apr. 21, 1959 |